United States Patent
Briancon et al.

(10) Patent No.: US 7,430,427 B2
(45) Date of Patent: Sep. 30, 2008

(54) RADIO RESOURCE MANAGEMENT SCHEDULER USING OBJECT REQUEST BROKER METHODOLOGY

(75) Inventors: Alain Charles Louis Briancon, Poolesville, MD (US); Maged Zaki, Pierrefonds (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/761,858

(22) Filed: Jan. 21, 2004

(65) Prior Publication Data

US 2004/0209633 A1    Oct. 21, 2004

Related U.S. Application Data

(60) Provisional application No. 60/441,642, filed on Jan. 21, 2003.

(51) Int. Cl.
*H04Q 7/20* (2006.01)

(52) U.S. Cl. .................. 455/512; 455/513; 455/527; 455/528; 455/425; 455/422; 455/550; 370/332; 370/338; 370/465

(58) Field of Classification Search ............... 455/425, 455/422, 550, 512, 527, 513, 528; 370/332, 370/465, 338
See application file for complete search history.

(56) References Cited

U.S. PATENT DOCUMENTS 6,771,624 B2 *   8/2004   Lu .............................. 370/332

2002/0004379 A1 *   1/2002   Gruhl et al. .................. 455/403
2003/0096608 A1 *   5/2003   Mortensen et al. ........... 455/425
2004/0132441 A1   7/2004   Livet et al.
2004/0166835 A1   8/2004   Johansson et al.

FOREIGN PATENT DOCUMENTS

| WO | 99/16227 | 4/1999 |
| WO | 99/16271 | 4/1999 |
| WO | 99/39528 | 8/1999 |
| WO | 00/14900 | 3/2000 |

OTHER PUBLICATIONS

Vucetic et al. (Vucetic), "Implementation and Performance Analysis of Multi-Algorithm Dynamic Channel Allocation in a Wideband Cellular Network", 1996 IEEE International Conference on Communications (ICC), vol. 3, Jun. 1996, pp. 1270-1274.*

Vucetic et al., "Implementation and Performance Analysis of Multi-Algorithm Dynamic Channel Allocation in a Wideband Cellular Network", 1996 IEEE International Conference on Communications (ICC), vol. 3, Jun. 1996, pp. 1270-1274.

Tibbitts, "COBRA: A Common Touch for Distributed Applications", Data Communications, McGraw Hill, May 1995, pp. 71-75.

* cited by examiner

*Primary Examiner*—Dwayne Bost
*Assistant Examiner*—Pierre-Louis Desir
(74) *Attorney, Agent, or Firm*—Volpe and Koenig, P.C.

(57) ABSTRACT

A method for scheduling RRM procedures in a wireless communication system begins by receiving at least one trigger, each trigger being associated with at least one RRM procedure. A radio link is placed into a busy state, whereby the radio link is accessible only by a currently executing RRM procedure. The RRM procedure is performed on the radio link, and a set of predicted measurements is prepared for use by the other RRM procedures. The radio link is placed into an idle state, whereby the radio link is accessible by any RRM procedure.

16 Claims, 15 Drawing Sheets

INTERFACE IDENTICAL FOR ALL ORB IMPLEMENTATIONS

THERE MAY BE MULTIPLE OBJECT ADAPTERS

STUBS AND SKELETONS FOR EACH OBJECT TYPE

ORB DEPENDENT INTERFACE

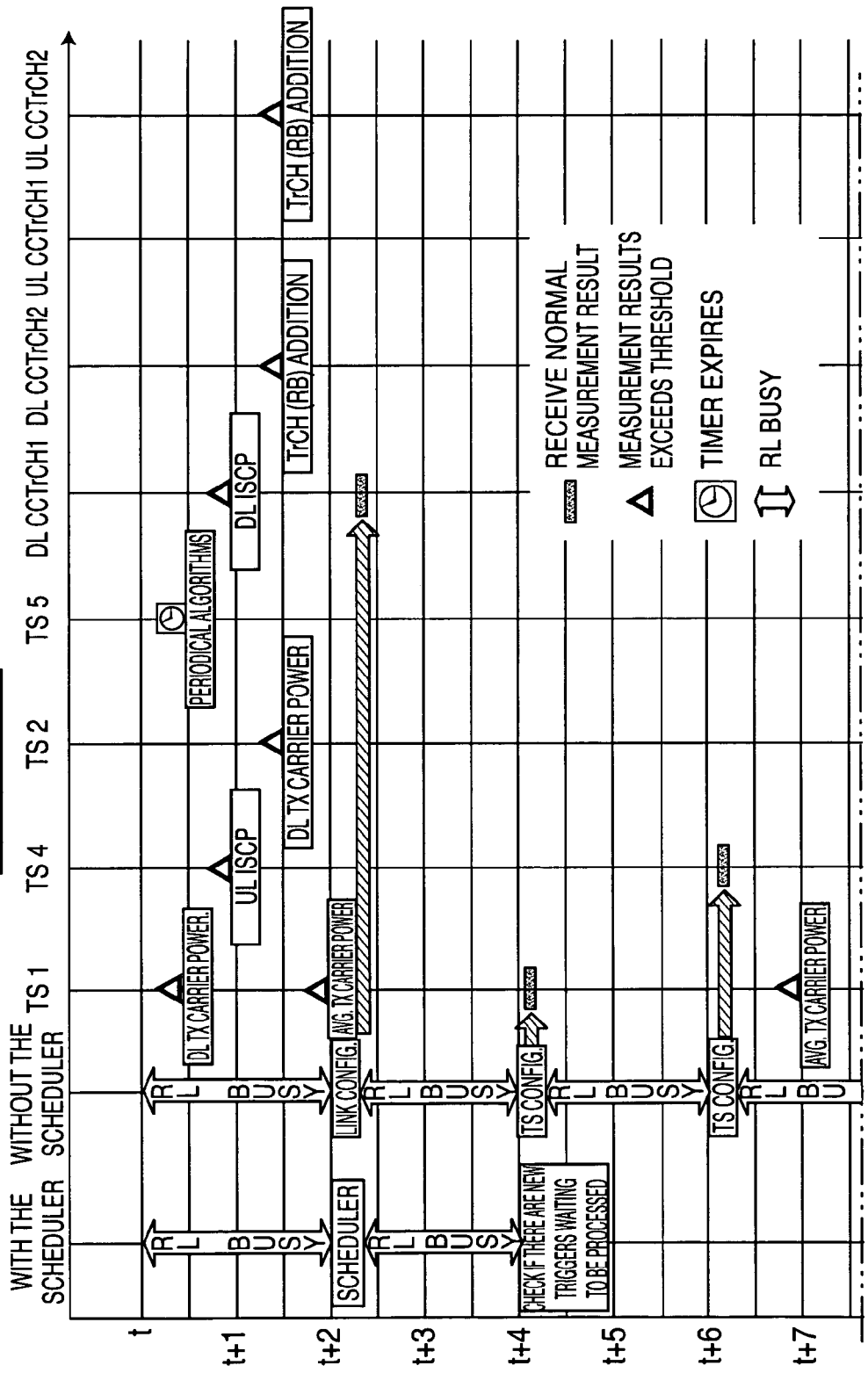

RADIO RESOURCE MANAGEMENT SCHEDULER USING OBJECT REQUEST BROKER METHODOLOGY

CROSS REFERENCE TO RELATED APPLICATION(S)

This application claims priority from U.S. Provisional Application No. 60/441,642, filed Jan. 21, 2003, which is incorporated by reference as if fully set forth herein.

FIELD OF INVENTION

The present invention generally relates to radio resource management (RRM) algorithms, and more particularly, to a method and system for scheduling RRM algorithms using an object request broker (ORB) methodology.

BACKGROUND

In an RRM approach used in the prior art, there are a plurality of RRM algorithms, each of which performs a different function and operates independently of the other RRM algorithms. Each algorithm has one or more associated triggers, and upon receiving a trigger, an algorithm executes to handle the trigger. The presently executing algorithm makes a decision to configure or reconfigure one of the radio links (RLs) or timeslots. Upon making the decision, the algorithm signals the new configuration throughout the entire system. FIG. 1 shows an example of algorithms and associated triggers operating independently according to the prior art approach. FIG. 2 shows an example of the algorithms in a controlling radio network controller (C-RNC) and a serving radio network controller (S-RNC) according to the prior art independent algorithm approach.

Individual RRM algorithms attempt to satisfy the request for one trigger for a specific timeslot or code, but do not consider other triggers and factors for the rest of the system. This leads to serious problems, because during the execution of the new configuration for one RL, the other triggers are ignored because an algorithm is busy trying to execute its own decision. This could lead to rejecting new service requests if the algorithm is busy solving a specific problem for a specific WTRU. Additionally, an RL can be torn down if there are other severe problems and they are ignored while the algorithm is trying to solve another problem.

Furthermore, two algorithms can act on the same problem at the same time. For example, in a C-RNC, the fast dynamic channel allocation (F-DCA) Escape procedure and the Slow Congestion Control procedure could be attempting to solve the problem of having a high uplink interference signal code power (ISCP) by taking different actions at the same time. A similar situation can exist in the S-RNC if, for example, the Outer Loop Power Control procedure is active and the Link Maintenance procedure is attempting to solve a Block Error Rate problem simultaneously. An even worse situation could exist, because an algorithm could reverse or conflict with the operation of a previously executed algorithm.

In this independent algorithm approach, multiple triggers cannot be processed as the same time. This could lead to rejecting a service request or a new call because another algorithm is busy fixing another problem for this RL.

The independent algorithm approach is not the optimal solution for the following reasons:

(1) There is no entity which coordinates between different algorithms. It is possible that two algorithms, working independently in parallel, could attempt to accomplish similar actions or even attempt to perform contradicting actions.

(2) Multiple triggers for various algorithms cannot be handled at the same time for a specific WTRU.

(3) New service requests for a given WTRU could be rejected if another algorithm is operating on this WTRU. This could have negative impact on the end user's perception of the system's operation.

(4) One measurement or event can trigger many algorithms. On the other hand, many measurements or events can trigger one algorithm. This multiple trigger/multiple response situation may cause conflicting actions to occur in the system.

(5) Different priorities cannot be assigned to different algorithms since there is no centralized entity to prioritize the algorithms.

(6) Measurement-based algorithms may base their decisions on measurements which are no longer valid, since another algorithm may be acting at the same time and changing the system conditions.

(7) There is a high level of signaling overhead involved in the independent algorithm approach.

(8) Some algorithms have been merged together to solve the interaction problems. But even after merging the algorithms, there are still some unsupported interaction scenarios.

(9) Some of the merged algorithms are run for real time (RT) calls only and other algorithms are run for non-real time (NRT) calls only. After merging the algorithms together, the individual algorithms do not necessarily have the knowledge of whether the call being processed is RT or NRT.

(10) In order to coordinate the independent algorithms with each other, each algorithm needs to be modified to include some coordination functionality. This functionality has to be spread across all of the algorithms, leading to redundant coding.

Accordingly, the decentralized approach of prior art RRM techniques does not provide optimum system performance.

SUMMARY

A method for scheduling radio resource management (RRM) procedures in a wireless communication system begins by receiving at least one trigger and evaluating the at least one trigger. RRM procedures are selected to execute, based upon the evaluation of the at least one trigger. The selected RRM procedures are executed and the results of the selected RRM procedures are analyzed. A subset of the selected RRM procedures are chosen to determine an optimal set of results, and the subset of RRM procedures are executed.

A method for scheduling RRM procedures in a wireless communication system begins by receiving at least one trigger, each trigger being associated with at least one RRM procedure. A radio link is placed into a busy state, whereby the radio link is accessible only by a currently executing RRM procedure. The RRM procedure is performed on the radio link, and a set of predicted measurements is prepared for use by the other RRM procedures. The radio link is placed into an idle state, whereby the radio link is accessible by any RRM procedure.

BRIEF DESCRIPTION OF THE DRAWINGS

A more detailed understanding of the invention may be had from the following description of a preferred embodiment, given by way of example, and to be understood in conjunction with the accompanying drawings wherein.

DETAILED DESCRIPTION OF THE PREFERRED EMBODIMENTS

Hereafter, a wireless transmit/receive unit (WTRU) includes, but is not limited to a user equipment, a mobile station, a fixed or mobile subscriber unit, a pager, or any other type of device capable of operating in a wireless environment. When referred to hereafter, a base station includes, but is not limited, to a Node B, a site controller, an access point, or any other type of interfacing device in a wireless environment.

Overview of Distributed Systems and ORB Technology

The rationale behind distributed systems is to facilitate the collaboration between individual components that communicate to achieve a common goal. The reasons for developing distributed systems are parallel processing, fault tolerance, task delegation, and resource sharing. Parallel processing involves spreading complex tasks over many components working in parallel to offer greater speed. Fault tolerance is obtained by performing the same computation multiple times to detect and to safely recover from the failure of individual nodes. Task delegation is the basis of client/server systems, where a server performs a particular service on behalf of the client. Resource sharing is a different kind of delegation, where systems offer their special information or hardware resources.

Figure 3:
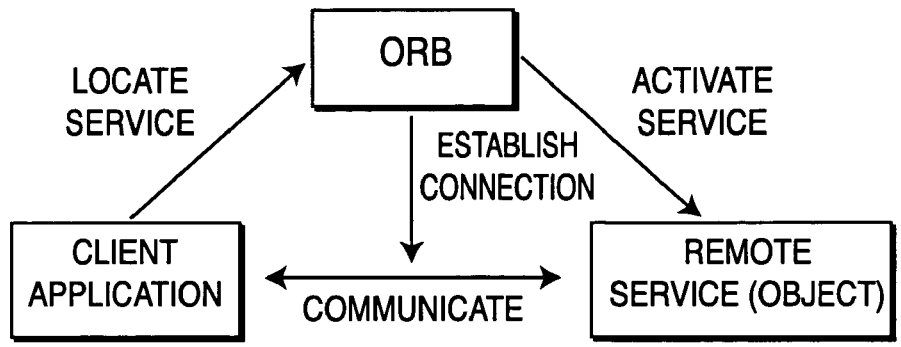
FIG. 3 is a block diagram showing a general overview of an object request broker (ORB) and its interaction with other system components.

The inherent complexity of a distributed system makes the distributed components harder to design, debug, and maintain than standalone pieces. However, the advantages of a distributed system are too promising to ignore. To solve this problem, a new layer of abstraction is introduced to facilitate communication between the various components and to hide the complexity of the system from the end user. An object request broker (ORB) is a middleware technology that manages communication and data exchange between objects. ORBs promote interoperability of distributed object systems. FIG. 3 shows a general overview of an ORB and its interaction with other system components.

An object request broker acts as a kind of telephone exchange. It provides a directory of services and helps establish connections between clients and these services. The ORB must support many functions in order to operate consistently and effectively, but many of these functions are hidden from the user of the ORB. It is the responsibility of the ORB to provide the illusion of locality, in other words, to make it appear as if the object is local to the client, while in reality it may reside in a different process or machine. Thus the ORB provides a framework for cross-system communication between objects. This is the first technical step toward interoperability of object systems.

The communication of objects across platforms is necessary for object system interoperability. An ORB allows objects to hide their implementation details from clients. There are many ways of implementing the basic ORB concept; for example, ORB functions can be compiled into clients, can be separate processes, or can be part of an operating system kernel. These basic design decisions might be fixed in a single product, or there might be a range of choices left to the ORB implementer.

There are two major ORB technologies: the Object Management Group's (OMG) Common Object Request Broker Architecture (CORBA) and the Microsoft Distributed Component Object Model (DCOM). An additional newly emerging ORB model is Remote Method Invocation (RMI); this is specified as part of the Java language/virtual machine. RMI allows Java objects to be executed remotely. This provides ORB-like capabilities as a native extension of Java.

Figure 4:
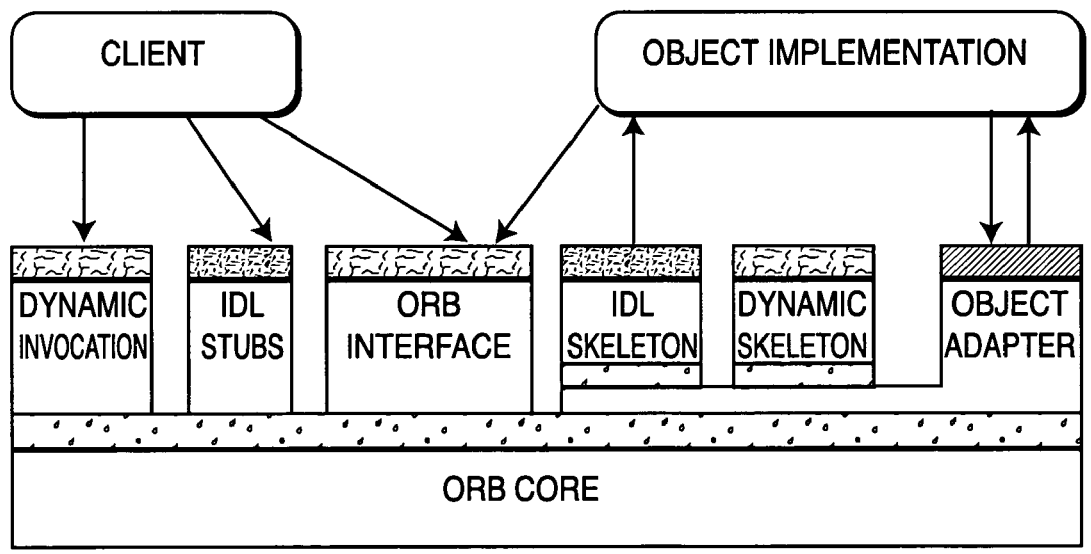
FIG. 4 is a diagram showing an overview of the construction of a Common Object Request Broker Architecture (CORBA) system.

As shown in FIG. 4, the Object Request Broker (ORB) is the most crucial component of CORBA. It provides a mechanism for transparently communicating client requests to target object implementations. As mentioned before, the ORB simplifies distributed systems implementation by decoupling the client from the details of the method invocations. This makes client requests appear to be local procedure calls even if the object implementation resides on different nodes. When a client invokes an operation, the ORB is responsible for finding the object implementation, transparently activating it if necessary, delivering the request to the object, and returning any response to the caller. In general, the ORB is not required to be a single component.

In order to make a request, the client can communicate with the ORB core through the Interface Definition Language (IDL) stub or through the Dynamic Invocation Interface (DII). The ORB core then transfers the request to the object implementation which receives the request as an up-call through either an IDL skeleton or a dynamic skeleton. CORBA IDL stubs and skeletons serve as the glue between the client and server applications, respectively, and the ORB. As another way to decouple applications from implementation details, the CORBA specification defines an abstract interface for an ORB (ORB interface). On the client side, the DII allows a client to directly access the underlying request mechanisms provided by an ORB. Similarly, on the server side, the Dynamic Skeleton Interface (DSI) allows an ORB to deliver requests to an object implementation that does not have knowledge of the type of the object it is implementing.

The Object Adapter assists the ORB with delivering requests to the objects and with activating the objects. It handles services such as generation and interpretation of object references, method invocation, security of interactions, object and implementation activation and deactivation, mapping references corresponding to object implementations, and registration of implementations. The client making the request has no idea whether the implementation is using the type-specific IDL skeletons or is using the dynamic skeletons.

ORB Scheduler Architecture

In general, all RRM algorithms operate in three steps. The first step is the measurement-filtering step, in which the algorithms receive measurements and perform the required filtering for these measurements. The second step is the decision making step, in which the mathematical and logical operations are performed to make a decision on the resource allocation or reallocation. The third step is the configuration/reconfiguration step, which involves executing the algorithm's decision by reconfiguring the entire system. The reconfiguration includes signaling the new configuration between the various nodes and performing the actual configuration in each node in the entire system. The decision making step does not take a long time to be performed, since it is executed as logical or mathematical operations. Conversely, the configuration/reconfiguration step takes a longer time to be performed considering the signaling and processing delays throughout the whole system. The decision-making step generally takes less than 0.5 milliseconds, but the configuration step can take from a few hundred milliseconds to one second.

In third generation (3G) systems, such as universal mobile telecommunications system (UMTS) terrestrial radio access (UTRA) time division duplex (TDD) systems, RRM algorithms manage multiple timeslots and each timeslot has many codes. Each RL contains multiple coded composite transport channels (CCTrCHs) and each CCTrCH can be mapped to multiple timeslots. Some algorithms' triggers are timeslot-based, while others are RL or CCTrCH-based. Each algorithm attempts to handle one specific problem without taking the overall system performance into consideration. One algorithm can be executed at a time. However, sometimes there is a need to consider the decisions made by multiple algorithms. Even worse, sometimes every few hundred milliseconds, an algorithm could reverse or conflict with operation of a previously executed algorithm, which could lead to a ping pong effect of changes being made and then undone.

Figure 5:
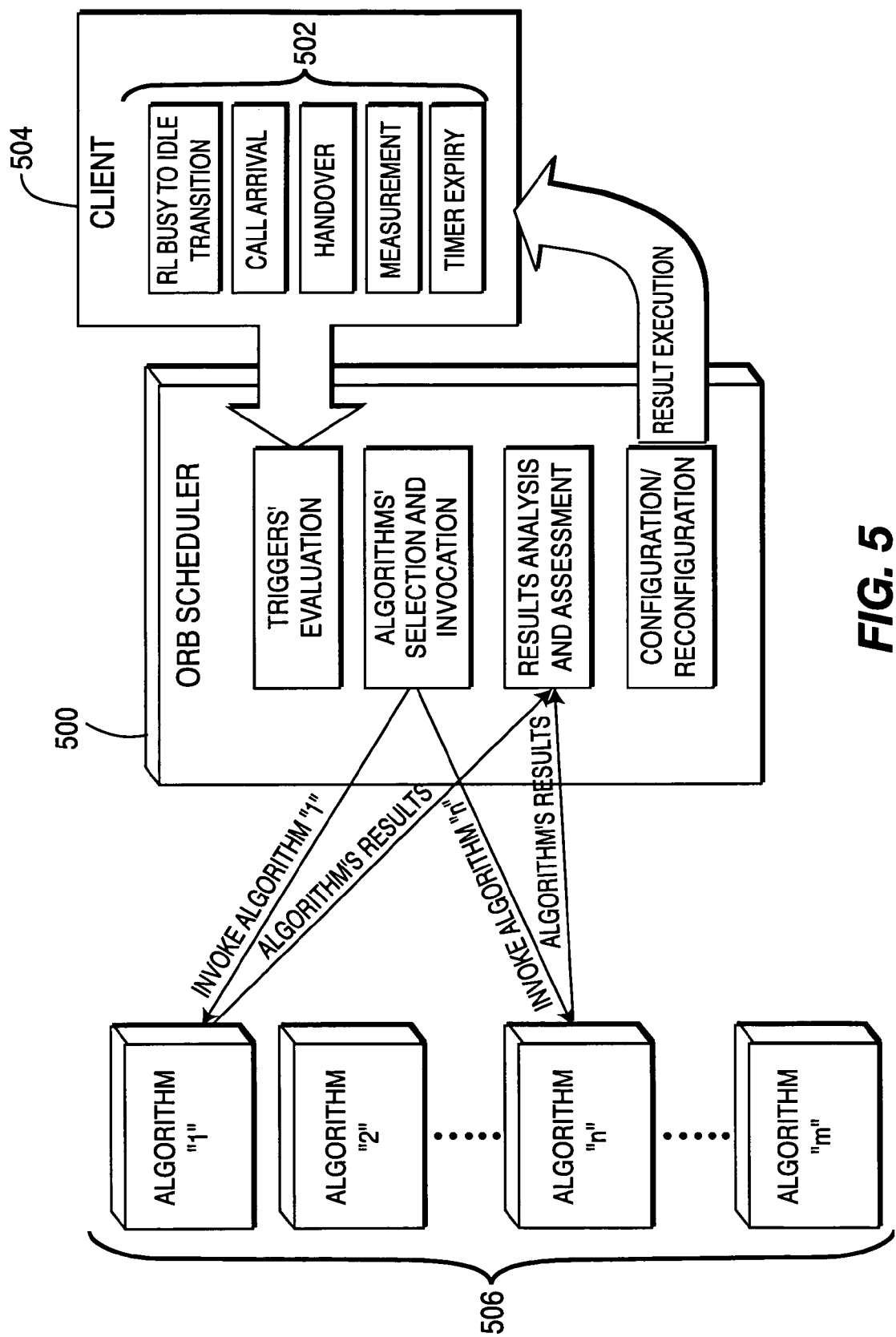
FIG. 5 is a diagram showing operation of an ORB scheduler constructed in accordance with the present invention.

As shown in FIG. 5, an ORB scheduler 500 constructed in accordance with the present invention solves these problems by handling multiple triggers 502 from a client 504 for the RRM algorithms 506 at the same time. All the RRM triggers 502 are gathered and stored together in the client 504. The ORB scheduler 500 receives all the triggers 502 from the client 504 and evaluates them. Upon evaluating the triggers 502, the scheduler 500 selects a set of candidate algorithms 506 (i.e., "n" out of "m" algorithms) to handle the triggers 502. Subsequently, the scheduler 500 invokes the decision-making part of the selected algorithms 506. The selected algorithms can be invoked in parallel or sequentially, based on its microprocessor's capabilities. Upon an algorithm's execution, the scheduler 500 analyzes the results and chooses the best decision made by the selected algorithms. This decision is the result of "k" algorithms, where k can take any value from 1 to n. The scheduler 500 performs the new configuration according to the decision made by the k algorithms and returns the final result to the client 504.

Distributed Systems and Interoperability Using ORB-to-ORB Communication

Distributed object systems make it possible to design and implement a distributed system as a group of reusable, modular, and easily deployable components where complexity can be easily managed and hidden behind a layer of abstraction. The ORB is a key enabler for distributed systems. By applying this methodology, RRM functionality can be distributed across multiple nodes (i.e., multiple physical nodes, multiple cards, or multiple microprocessors). It is beneficial to have a distributed RRM and allowing RRM functions to be implemented in multiple nodes. The ORB scheduler is used to enable seamless interaction between functions on these multiple nodes. Multiple algorithms and functions can work in parallel even on different microprocessors or physical entities. Some critical operations need redundancy, which can be obtained by running the same or similar functions in parallel. The scheduler chooses the best decision taken by these various functions. If one algorithm or function fails to operate, the other functions are still functioning as a backup.

Figure 6:
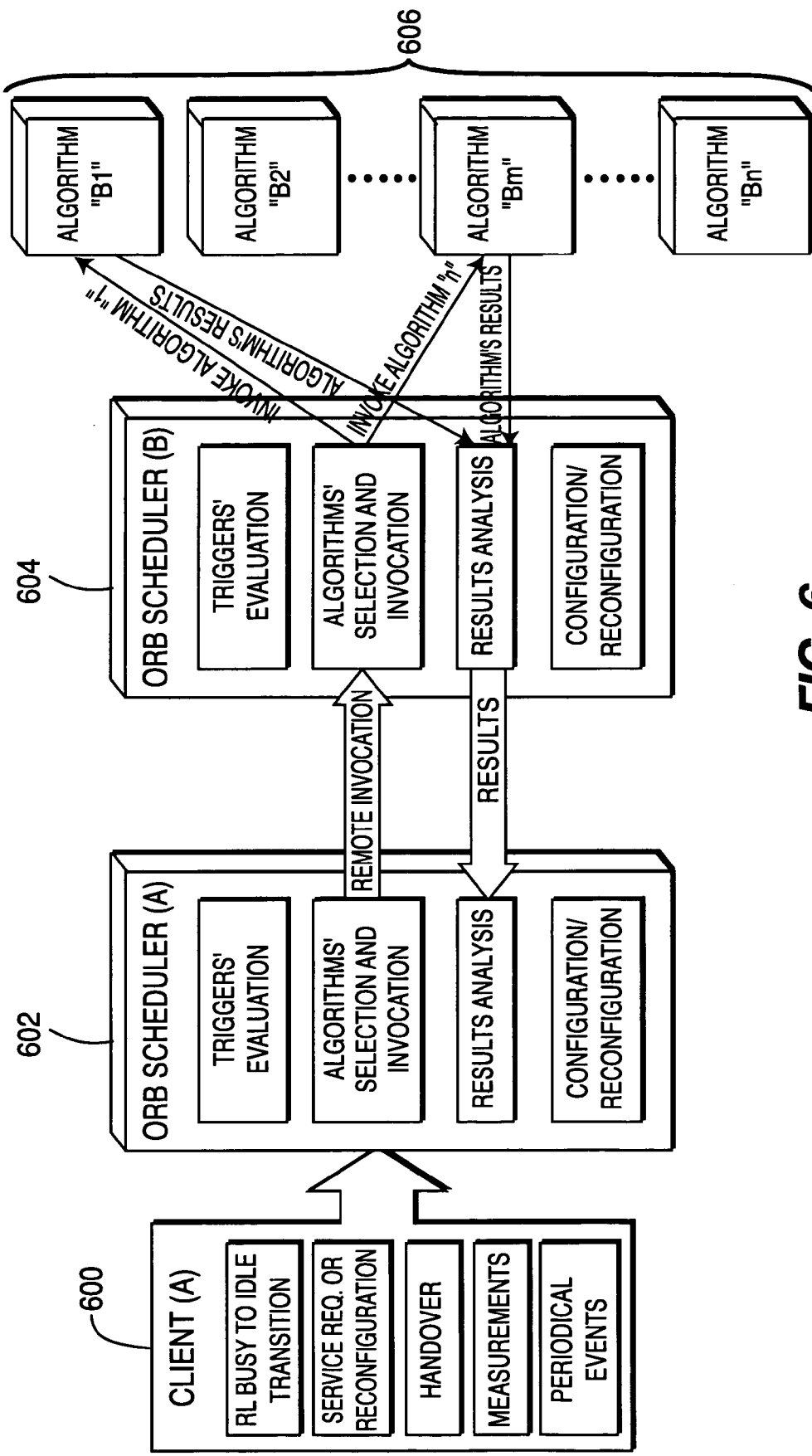
FIG. 6 is a diagram showing remote node interaction in the ORB scheduler shown in FIG. 5.

As shown in FIG. 6, a client 600 on node "A" sends a request or trigger to the ORB scheduler on its node (i.e., ORB Scheduler A 602). When the ORB scheduler 602 examines the trigger and discovers that the target algorithm is on a remote node (ORB Scheduler B 604), it routes the invocation out to the remote node's ORB. The node B scheduler 604 invokes the appropriate functions 606 locally as explained before and sends the results back to ORB Scheduler A 602. Scheduler A 602 analyzes the results as usual, performs the required configuration, and/or sends the results back to client A 600.

Example of Applying the ORB Scheduler Concept in RRM (High Level)

In RRM, the ORB scheduler is used to coordinate between various RRM algorithms and functions and tries to reach the best result for the entire system in the shortest period of time. The client in the RRM sends a trigger to the scheduler in case one or more of the following events has occurred:

(1) RL is transitioned from a BUSY state to an IDLE state. The RL state is set to BUSY when it is being configured or reconfigured. When the new configuration or reconfiguration is completed, the RL state is put back to IDLE. (RL states are discussed further in connection with FIG. 11, below.) The client sends a trigger to the scheduler to act upon all the events that were pending because this RL was BUSY. The ORB scheduler will check for the list of events or triggers and act upon them.

(2) Service request and reconfiguration (call arrival or RL reconfiguration request). This event represents call arrivals or requests for RL reconfigurations. These requests will be queued if the RL is busy or if there are not enough resources in the cell to admit the user.

(3) Handover triggers, such as event 1G or event 2B. Event 1G occurs when the primary common control physical channel (P-CCPCH) received signal code power (RSCP) of a neighbor cell becomes better than the previous best cell. Event 2B occurs when the estimated quality of the currently used frequency is below a certain threshold and the estimated quality of a non-used frequency is above a certain threshold.

(4) Measurements. If a measurement has crossed a certain threshold, it will trigger certain algorithms to fix the problem. Some of these measurements are cell-based and are reported per timeslot, and other measurements are RL-based and are triggered per RL or CCTrCH.

(5) Cell-based measurements per timeslot. The cell-based measurements are reported per timeslot, and indicate a congestion or high interference in a certain timeslot.

(6) RL-based measurements per CCTrCH or RL. The RL-based measurements are reported per RL or CCTrCH, and indicate a problem with a certain CCTrCH.

(7) Periodical events. Some algorithms are triggered periodically or are based on averaged measurements over certain period of time.

Figure 7:
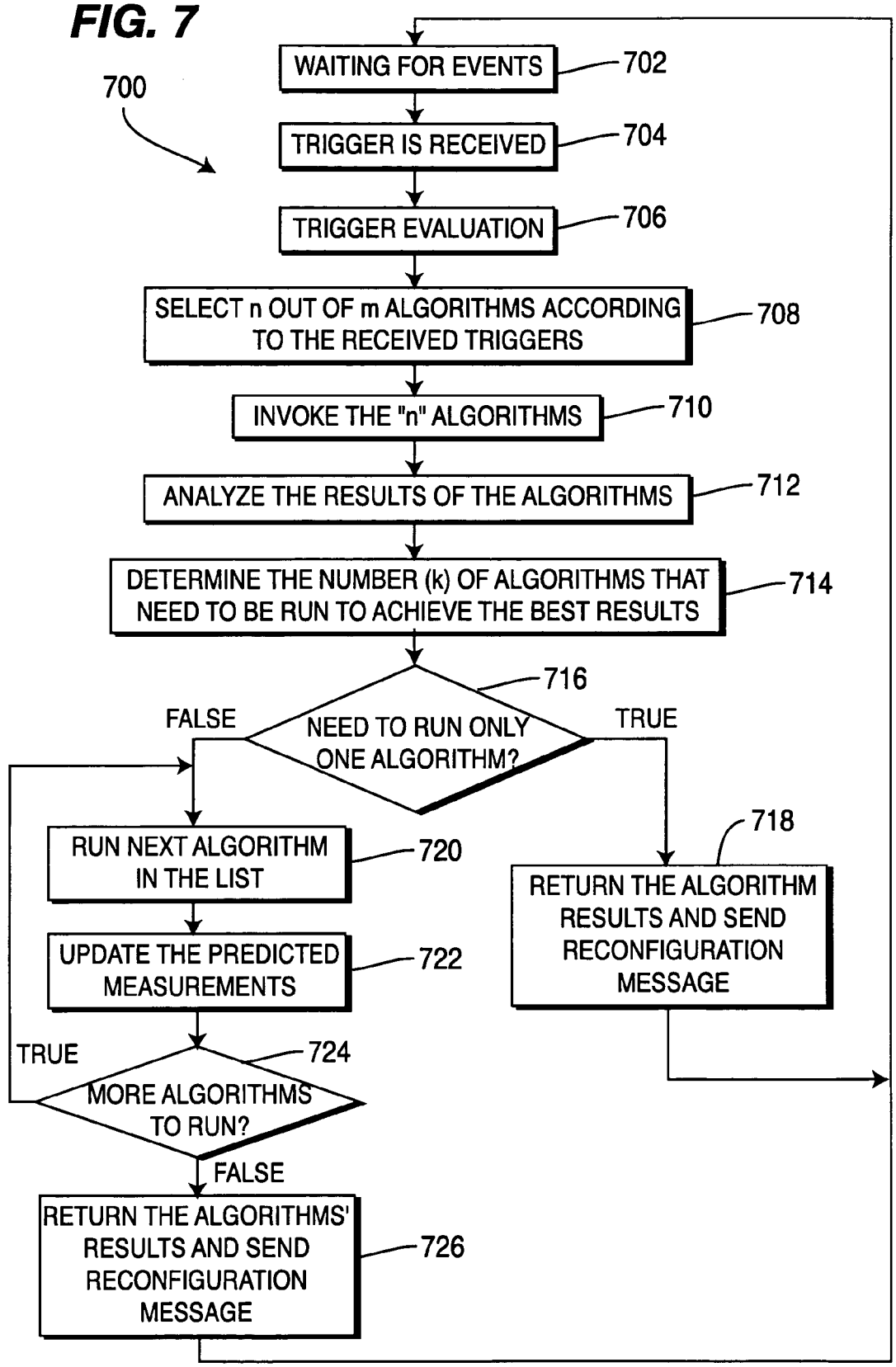
FIG. 7 is a flow diagram showing an overview of the operation of an ORB scheduler constructed in accordance with the present invention.

FIG. 7 shows a high-level overview of a procedure 700 for the operation of the scheduler. The procedure 700 begins by waiting for events to be received (step 702). When the ORB scheduler receives one or more triggers from the client (step 704), it checks all the events queued for request and evaluates these events (step 706). According to the events, it invokes appropriate algorithms. If there are "m" algorithms or functions in total, the ORB scheduler chooses "n" out of "m" algorithms that can potentially handle the events requested by the client (step 708). The ORB scheduler invokes the n algorithms in parallel or sequentially (step 710). Upon the algorithms' execution, the scheduler analyzes the results obtained from these algorithms (step 712) and decides if there is a candidate algorithm or group of algorithms that can provide the best results (steps 714, 716). If one algorithm can solve the problem, it will send the results to the client, set the RL state to BUSY, and perform the new configuration or reconfiguration (step 718). When the reconfiguration is completed, the scheduler sets the RL state back to IDLE and the procedure returns to step 702 to wait for additional events.

If more than one algorithm is required for the best outcome (step 716), the scheduler prioritizes the algorithms and calls them in order. Typically, handover and congestion control take precedence over admission control or optimization algorithms. However, the scheduler assigns the priority of execution dynamically according to system's state. Upon each algorithm's execution (step 720), the predicted measurements are calculated (step 722), so the next algorithm checks the new measurements as predicted by the previous algorithm and takes them into consideration. If there are still more algorithms to be run (step 724), then the procedure continues at step 720. Upon executing all the algorithms, the scheduler sends the results to the client, sets the RL state to BUSY, and performs the new configuration or reconfiguration (step 726). When the reconfiguration is complete, the scheduler sets the RL state back to IDLE and the procedure returns to step 702 to wait for additional events.

The Benefits of Applying the ORB Scheduler Concept in RRM

The following advantages are recognized by applying an ORB scheduler in accordance with the present invention.

(1) Trying to avoid new call rejection or reconfiguration for existing RLs.

(2) The schedulers orchestrate between various algorithms to provide the best possible performance, since the scheduler can take the outcome of multiple algorithms and base its decision on that information. This leads to the most appropriate action for a given WTRU and cell, thereby optimizing the entire system's performance.

(3) The scheduler is more suitable for software implementation, since having each algorithm as a separate process or task could create contention problems in real-time operating systems (RTOS).

(4) It is easier to introduce new algorithms into the system, as the scheduler controls the interaction between different algorithms, the existing algorithms themselves do not need to be modified.

(5) The design of the scheduler is not affected by changes in the algorithms and their interaction.

(6) Dynamic priority assignments for algorithms according to the system's state can be made.

Example Illustrating the Benefits of Applying the ORB Scheduler in RRM

Figure 1:
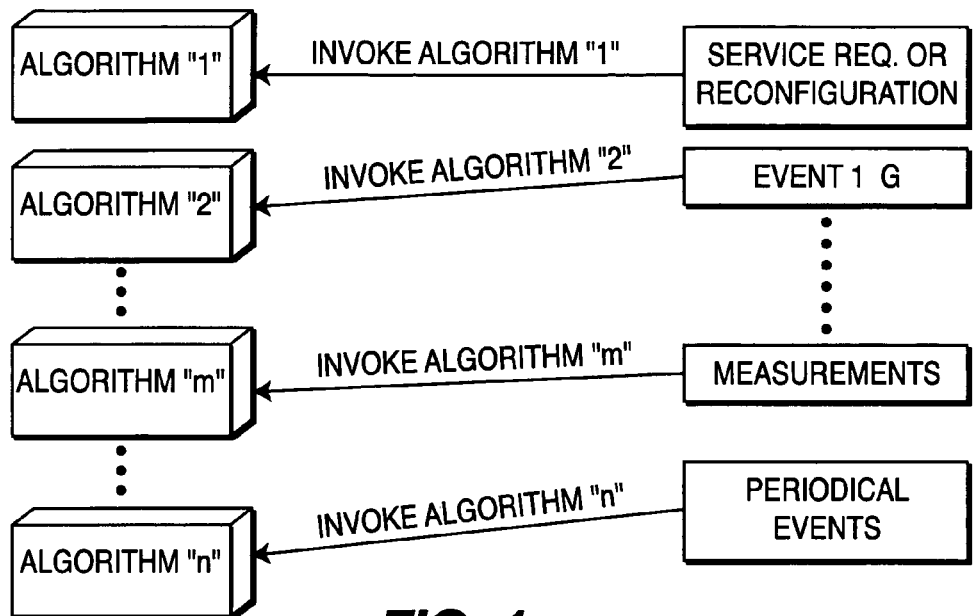
FIG. 1 is a block diagram of algorithms operating under the prior art independent algorithm approach.
Figure 8:
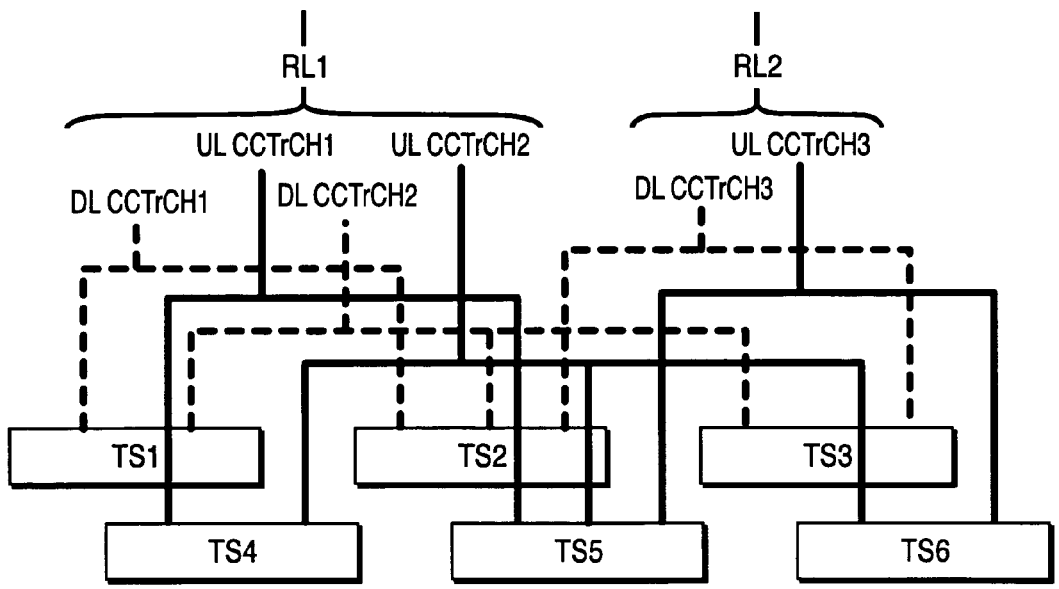
FIG. 8 is a diagram showing coded composite transport channel (CCTrCH) and timeslot (TS) mapping.

As shown in FIG. 8, in TDD technology, there are multiple timeslots. Some of the timeslots are assigned for uplink and others are assigned for downlink. One CCTrCH can be mapped to multiple timeslots. Also, each RL can contain up to eight CCTrCHs. Some RRM algorithm triggers are timeslot-based, while others are RL or CCTrCH-based.

Figure 9:
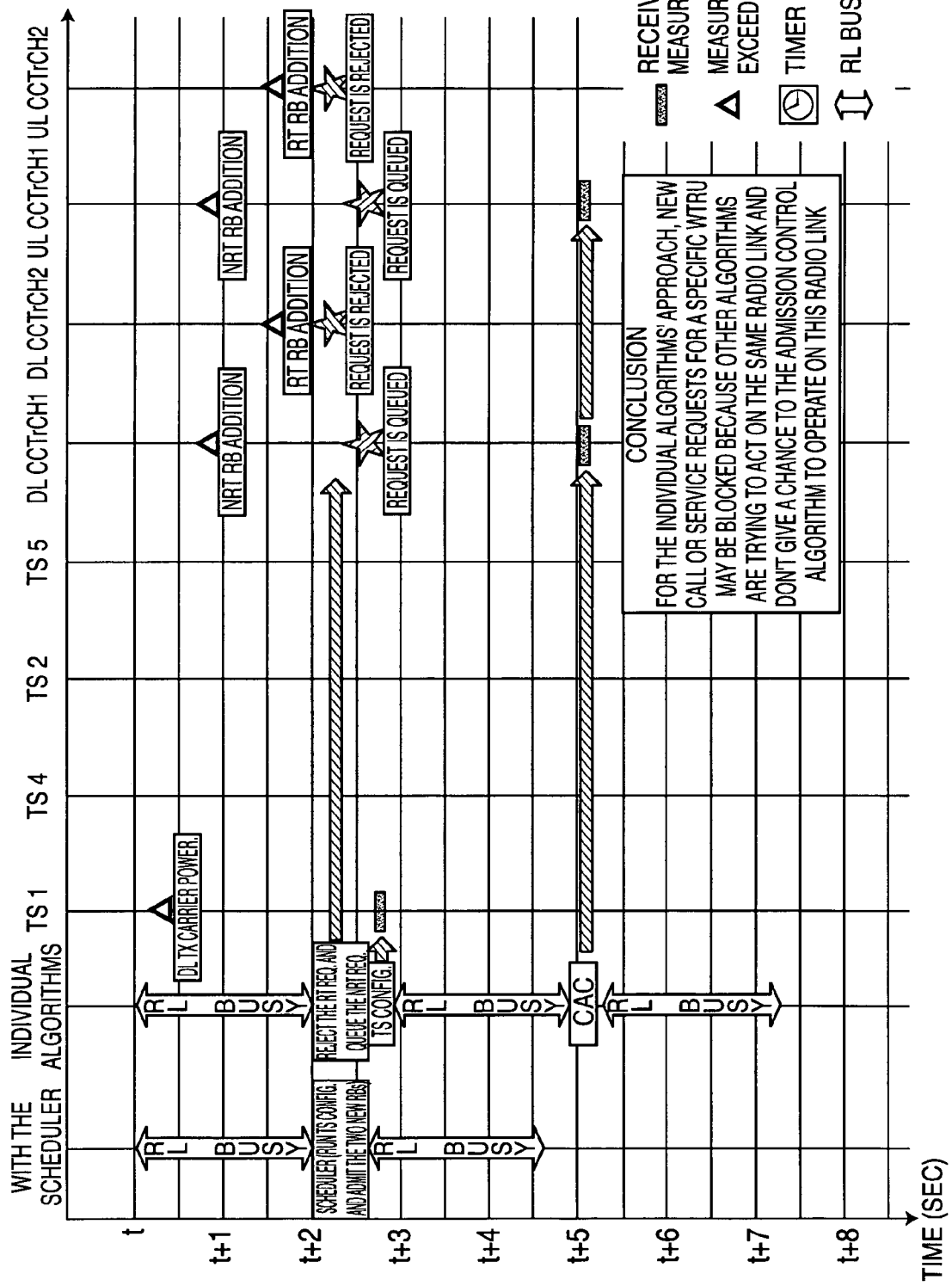
FIG. 9 illustrates an example of the operation of the ORB scheduler of the present invention versus the operation of the prior art independent algorithm approach.

FIG. 9 shows an example comparing system operation using the scheduler versus using the independent algorithms approach. The first column shows the scheduler behavior and the second column shows the independent algorithm approach behavior. It shows that in the independent algorithms' approach, new call or service requests for a specific WTRU may be blocked because other algorithms are trying to act on the RL and they do not permit the admission control algorithm to operate on this RL. In this example, the CCTrCH/TS mapping shown in FIG. 8 is assumed, meaning that CCTrCH1 and CCTrCH2 belong to RL1, and they are mapped to TS1 through TS6. In this scenario, while the RL is busy because one of its CCTrCHs is being configured, the following triggers are received:

(1) high downlink (DL) transmission (Tx) Carrier Power in TS1;

(2) a request to add a transport channel carrying a non-real time (NRT) radio bearer to CCTrCH1; and (3) a request to add a transport channel carrying a real time (RT) radio bearer to CCTrCH2.

Under the prior art independent algorithms approach, at time t+2, the timeslot configuration algorithm(s) are triggered to handle the high DL Tx Carrier Power in TS1. Since RT requests cannot be queued, the RT request will be rejected. However, the NRT request will be queued until the RL is free again. At time t+5, if there are no other requests pending, the NRT request is processed by the call admission control (CAC) algorithm. If there are other requests pending, even the NRT request could be blocked until the request is rejected, because it has been queued for a long time without being processed.

Under the ORB scheduler approach, at time t+2 when the RL is set to IDLE, the scheduler runs the timeslot configuration algorithm(s) and the call admission control algorithm(s) to admit the RT and NRT requests. The call admission control algorithm(s) will consider the measurements predicted by the timeslot configuration algorithm(s). If admitting the new request will not cause excessive interference, the requests can be admitted right away, and the scheduler performs the configuration decided by the slow congestion control (SCC) escape and the call admission control (CAC) algorithm simultaneously. The SCC escape algorithm is responsible for controlling and avoiding uplink and downlink congestion in the system.

Figure 10B:
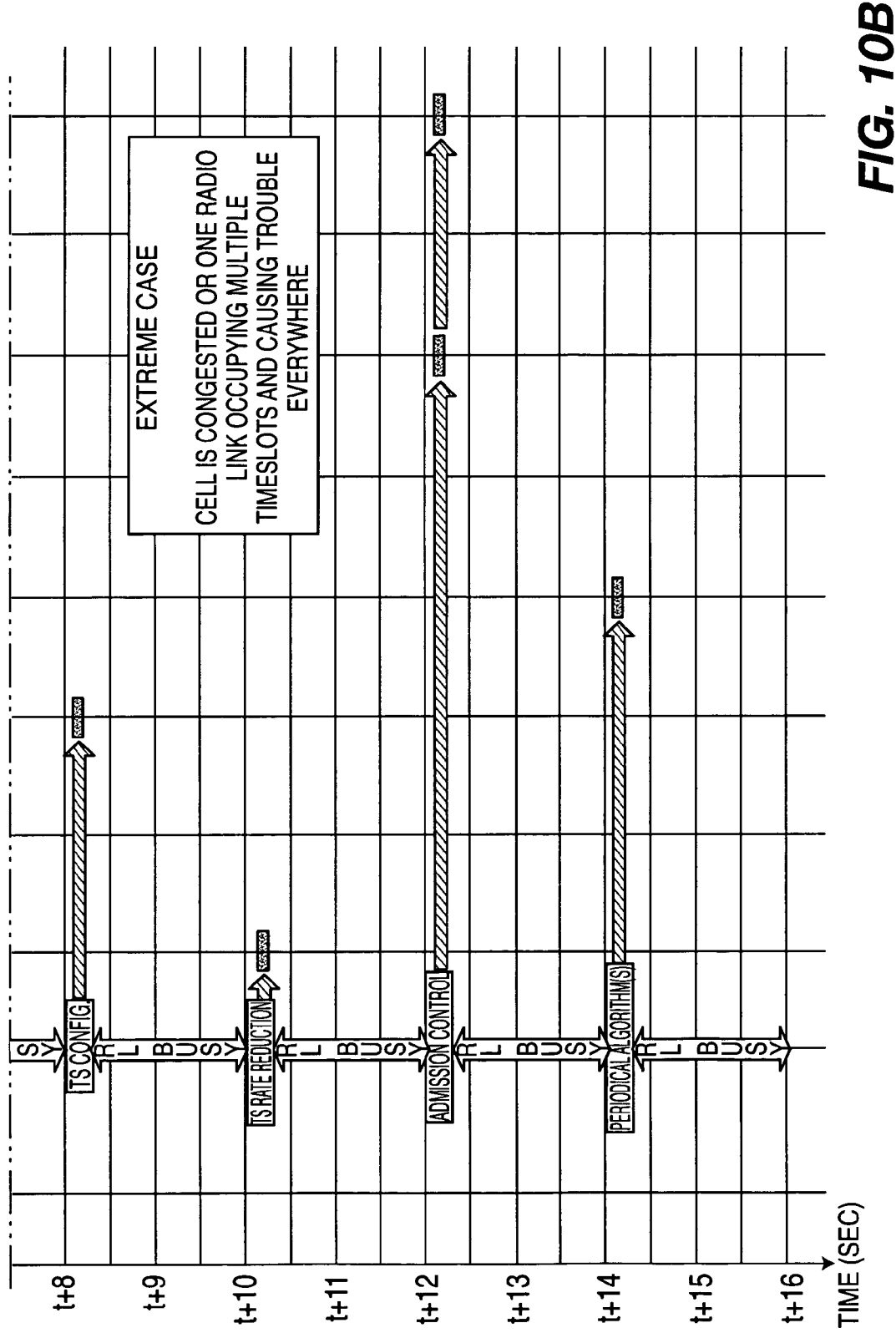
FIG. 10 illustrates a second example of the operation of the ORB scheduler of the present invention versus the operation of the prior art independent algorithm approach.

FIG. 10 shows a second example comparing the system operating using the scheduler versus using the independent algorithms approach. The first column shows the scheduler behavior and the second column shows the independent algorithm behavior. In this scenario, many triggers are received between time t and time t+2. The reason for such a large number of triggers could be cell congestion or one radio link occupying multiple timeslots and causing trouble in multiple timeslots. Assume for purposes of this example that the following triggers are received between time t and time t+2:

(1) high DL Tx Carrier Power in TS1;
(2) high average Tx Carrier Power in TS1;
(3) high DL Tx Carrier Power in TS2;
(4) high uplink (UL) interference signal code power (ISCP) in TS4;

(5) fast dynamic channel allocation (F-DCA) Background timer expiry;

(6) high DL ISCP in DL CCTrCH1; and (7) a request to add a transport channel carrying a NRT radio bearer to CCTrCH2.

Under the independent algorithms approach of the prior art, at time t+2, the link configuration reconfiguration algorithms are run to correct the high DL ISCP in DL CCTrCH1, by attempting to move DL CCTrCH1 to another timeslot to fix the high interference for this RL. At time t+4, the timeslot configuration algorithms are triggered to handle the high DL Tx Carrier Power in TS1 by moving one of the CCTrCHs in TS1 to another timeslot to reduce the Tx Carrier Power in TS1. At time t+6, the timeslot configuration algorithms are triggered to handle the high UL ISCP in TS4 by moving one of the CCTrCHs in TS4 to another timeslot to reduce the high UL ISCP in TS4.

At time t+8, the timeslot configuration algorithms are triggered to handle the high DL Tx Carrier Power in TS2 by moving one of the CCTrCHs in TS2 to another timeslot to reduce the Tx Carrier Power in TS2. At time t+10, the timeslot rate control algorithms are triggered to correct the high average DL Tx Carrier Power in TS1 by reducing the rate of the transport channels in one CCTrCH. At time t+12, the admission control algorithm is triggered to add a new transport channel carrying an RT radio bearer to CCTrCH2. At time t+14, the periodical algorithm is run, since it was queued waiting for the RL to be free.

Under the ORB scheduler approach of the present invention, at time t+2, the scheduler runs the timeslot configuration algorithms in TS1, TS2, and TS4. The scheduler then checks the predicted measurements in TS1; if the problem is not solved, it runs timeslot rate control. Then, the scheduler runs the link configuration algorithms and checks if the decision made by the link control algorithm(s) is redundant to the timeslot configuration algorithm(s) results, or if there is no need to take the decision made by the link control algorithm(s) into consideration since the timeslot configuration algorithm(s) have already solved the problem. The scheduler then invokes the call admission algorithm(s), which checks the predicted measurements to determine whether the user can be admitted or not. At time t+4, the scheduler checks if there are still users pending.

Implementation of the Scheduler

This section provides an example of a preferred implementation for the ORB scheduler and how this concept can be applied for RRM. There are many other ways of implementing the scheduler which are based on the same concept.

RL States

Figure 11:
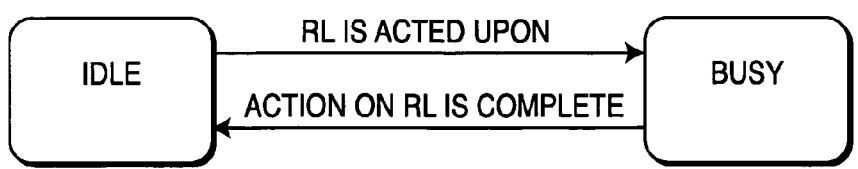
FIG. 11 is a radio link (RL) state model diagram, used by the scheduler shown in FIG. 7.
Figure 2:
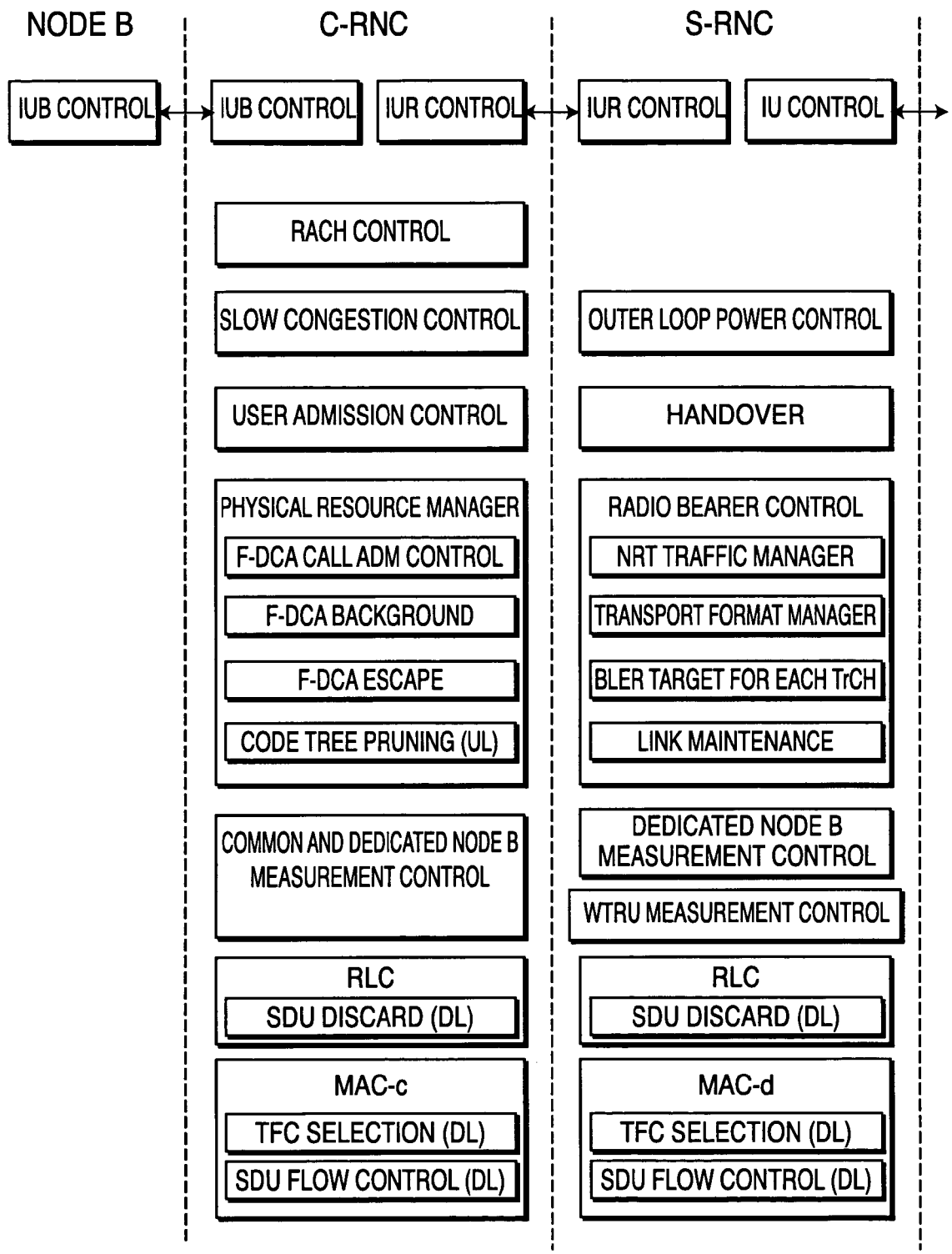
FIG. 2 is a diagram of the algorithms contained in a C-RNC and a S-RNC according to the prior art independent algorithm approach.

The objective of the RL state diagram shown in FIG. 11 is to allow optimal RRM decisions based on the state of an RL, and to enhance coordination between the different RRM algorithms. This RL state diagram is present in the C-RNC and S-RNC for each RL. There are two states of operation: IDLE and BUSY, between which the RL can transition depending on the situation. The IDLE state represents an RL under normal operation with no RRM algorithm acting upon it. The BUSY state is entered when an RRM algorithm is triggered and starts to act upon the RL.

First, when a dedicated RL is being established for a WTRU, an RL entity is created in the C-RNC and the S-RNC. Upon receipt of an RL Setup message, the RL entity is created and is placed into the BUSY state. The first procedure carried out for that RL entity is call admission control (CAC), which analyzes if the RL can be admitted into the system and, if enough resources are free, reserves the corresponding Resource Units (RUs) for that purpose. Once the RL has been admitted, allocated, and the setup signaling process has finished, the RL entity transitions from the BUSY state to the IDLE state.

The BUSY state is entered again when an RRM algorithm is triggered and starts to act upon this RL. The RL remains in the BUSY state for the entire time that a procedure is being carried out by an RRM algorithm. Based on the decision made by the RRM algorithm concerning this RL, the RL will be configured or reconfigured and the signaling procedure for this configuration is performed. Upon successful configuration of this RL in the whole system (in the RNC, the Node B, and the WTRU) over the different interfaces (Iur, Iub, Uu), the RL returns to the IDLE state to wait for other algorithms to act upon it as needed.

The notion behind using the RL states is to coordinate between different algorithms. This prevents two or more algorithms from acting upon the same RL at the same time. The RL state can be set to BUSY for a longer period as a design decision if needed. Meanwhile, various algorithms can act on other RLs, even if the RLs are located on the same timeslot. So there is no need to block the whole timeslot if one or more of its RLs are being configured. If an algorithm needs to act upon an RL while another algorithm is acting upon another RL in-the same timeslot, it uses the predicted values for the timeslot metrics, instead of using the received measurements. These predicted values are over-estimated for this timeslot to account for power convergence and the instability of the timeslot while being reconfigured. This assures making conservative decisions during timeslot reconfiguration by two different algorithms. In this context, a "conservative decision" is a decision that provides system stability and prevents the "ping pong" effect of making and undoing changes. Conservative estimates of the predicted measurements help to achieve system stability.

ORB-Based RRM Client

The client can be implemented as a centralized database, including the following information:

(1) cell-based measurements (per timeslot);

(2) RL-based measurements (per CCTrCH);

(3) handover triggering measurements;

(4) new call arrival;

(5) periodical measurement timer expiry; and (6) RL transition from the BUSY state to the IDLE state.

If one of the above events arrives at the client, the client sends a trigger to the scheduler to process the request. If the request is processed successfully the event flag is reset. Each trigger (a field in the database) can have multiple attributes or values, such as pending on busy RL, failed, processed, or succeeded. These attributes are used to determine the state of all the queued requests. If one algorithm is pending or blocked because the RL is busy, the algorithm sends a trigger to the scheduler to check the request whenever the corresponding RL is freed (transitioned to the IDLE state).

The notion behind the centralized database is to store all the events that k could trigger certain algorithms. If the event is received and can not be served because the RL is busy or the system is congested, and the algorithm fails to solve the problem, the event or the request is stored in this centralized database if the scheduler did not decide to ignore the request or reject it right away. The centralized database can be accessed by the ORB scheduler and all other algorithms, which can write to, or read from, the database. If the RL is busy and an event arrives for this RL, it is stored in the centralized database. The event could be a timeslot measurement higher than certain threshold, a RL measurement higher than certain threshold, a call arrival, a handover trigger, or one RL transitioned from the BUSY state to the IDLE state.

Figure 12:
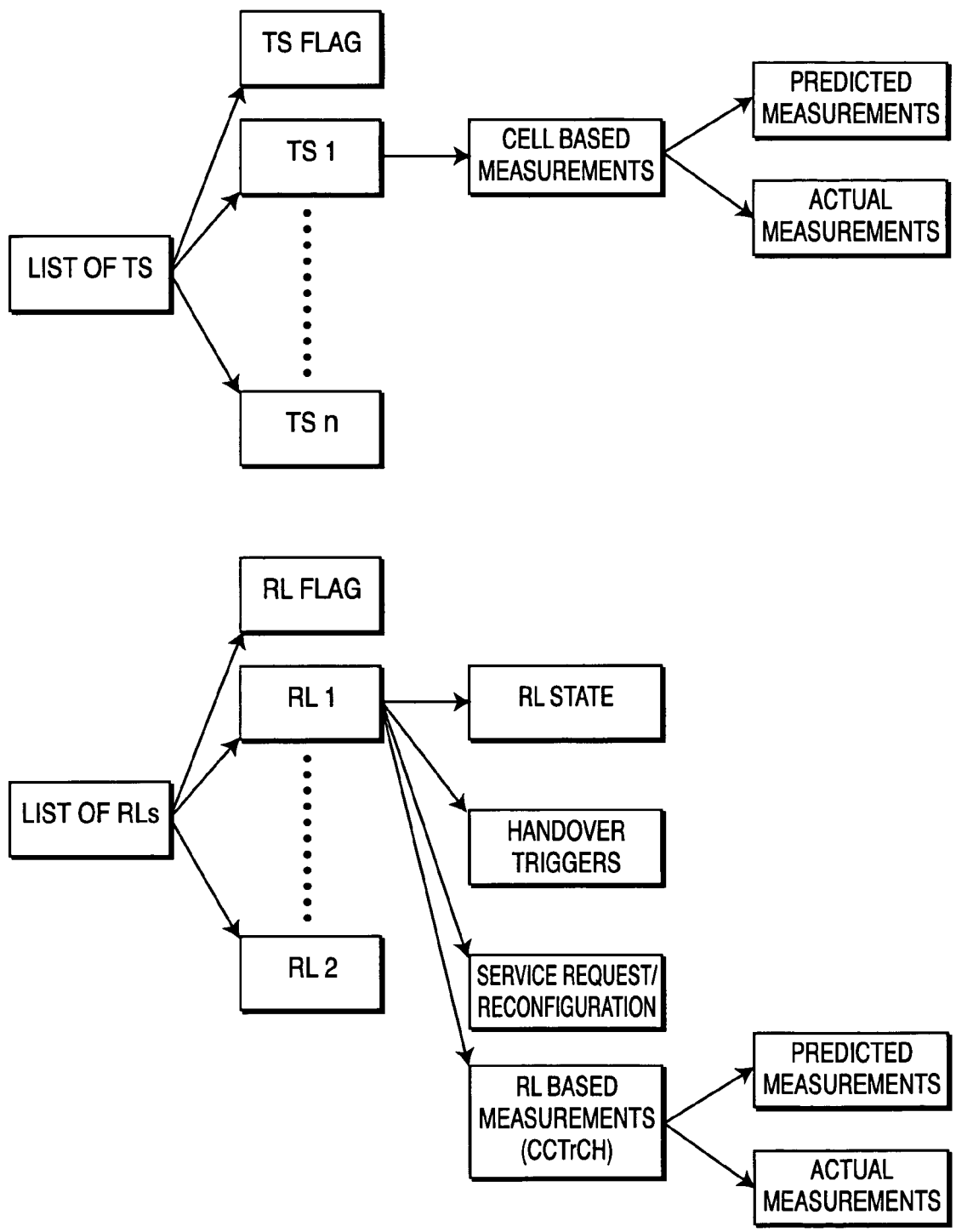
FIG. 12 is a block diagram showing an example of a database constructed for use with the scheduler shown in FIG. 7.
Figure 13A:
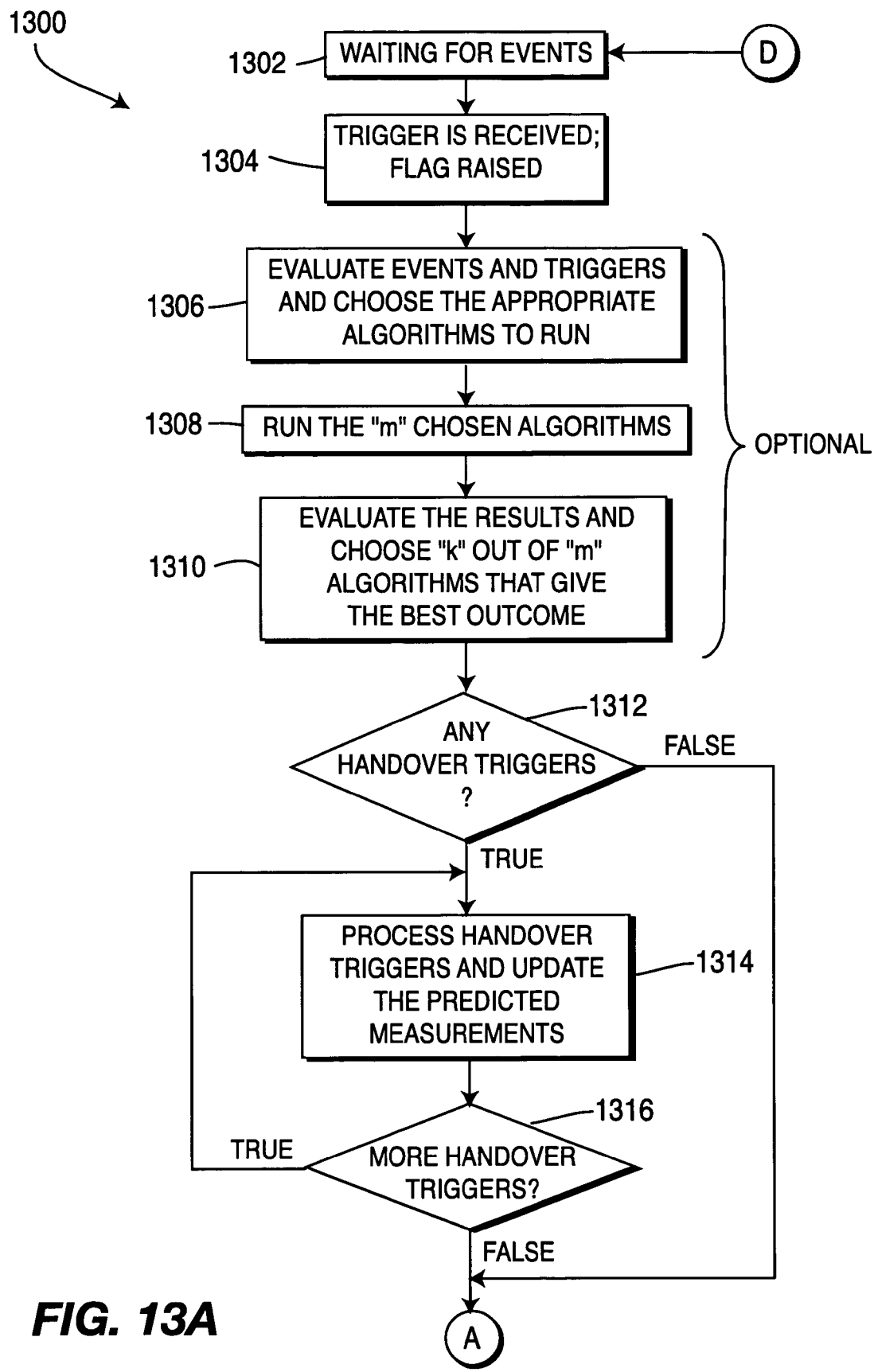
FIGS. 13A-13D are flowcharts showing detailed operation of an ORB scheduler constructed in accordance with the present invention.
Figure 13B:
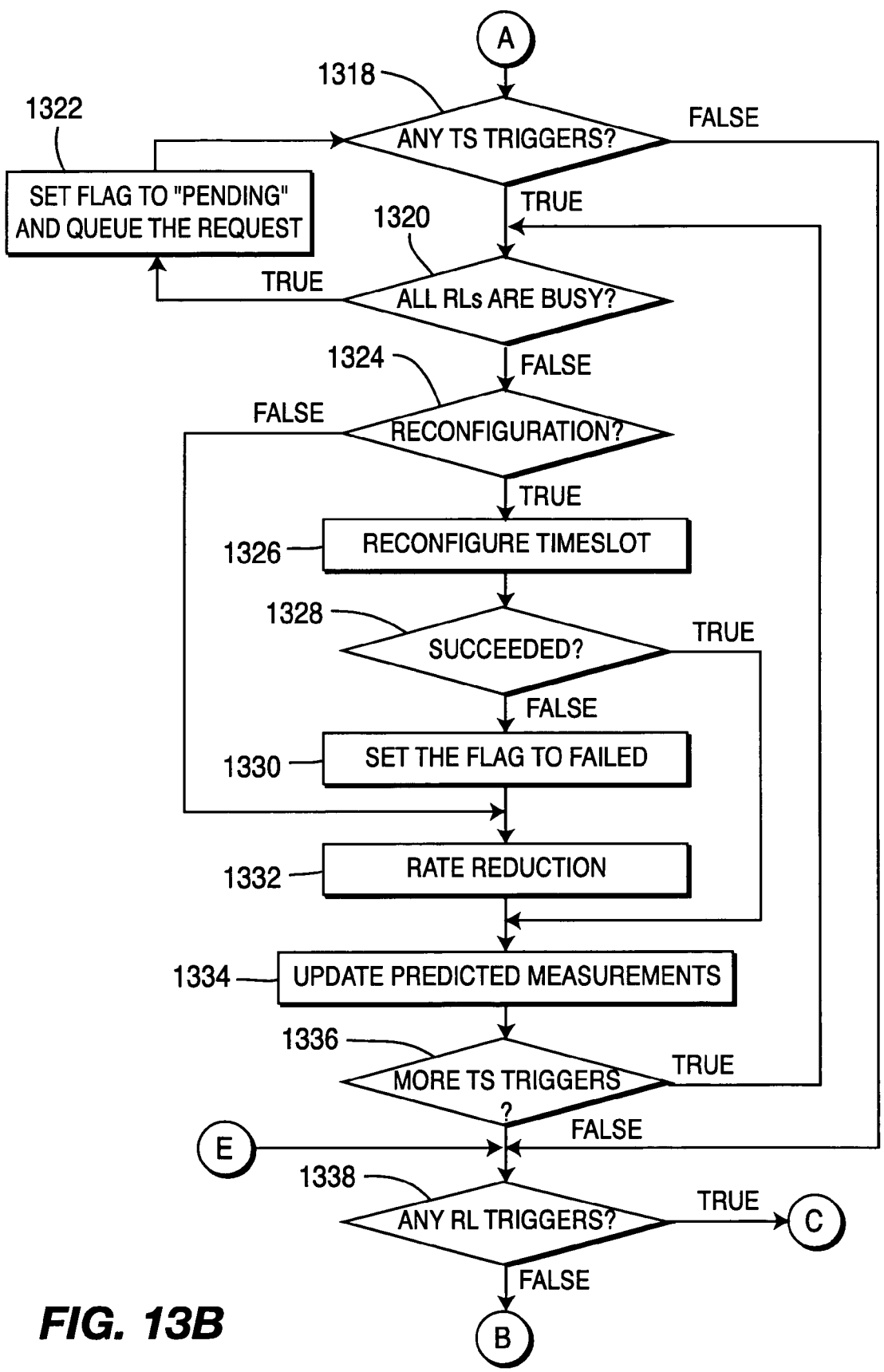
Figure 13C:
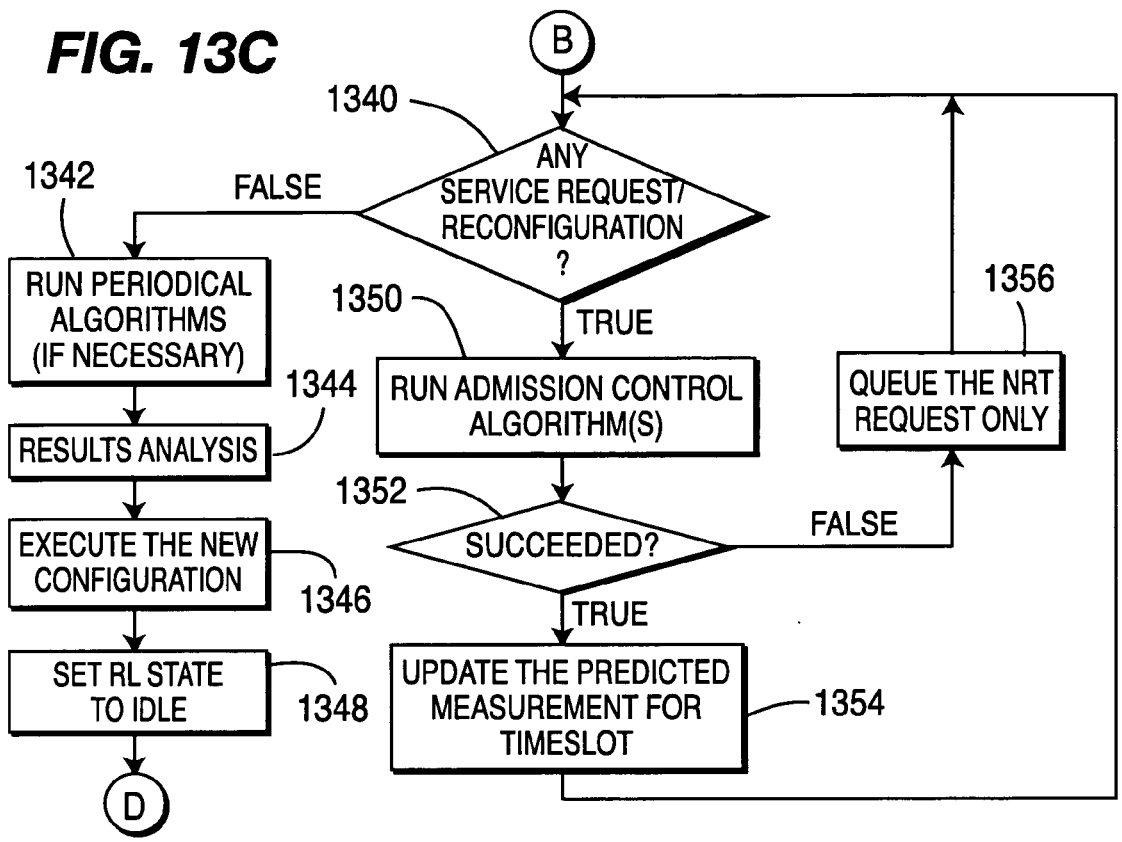
Figure 13D:
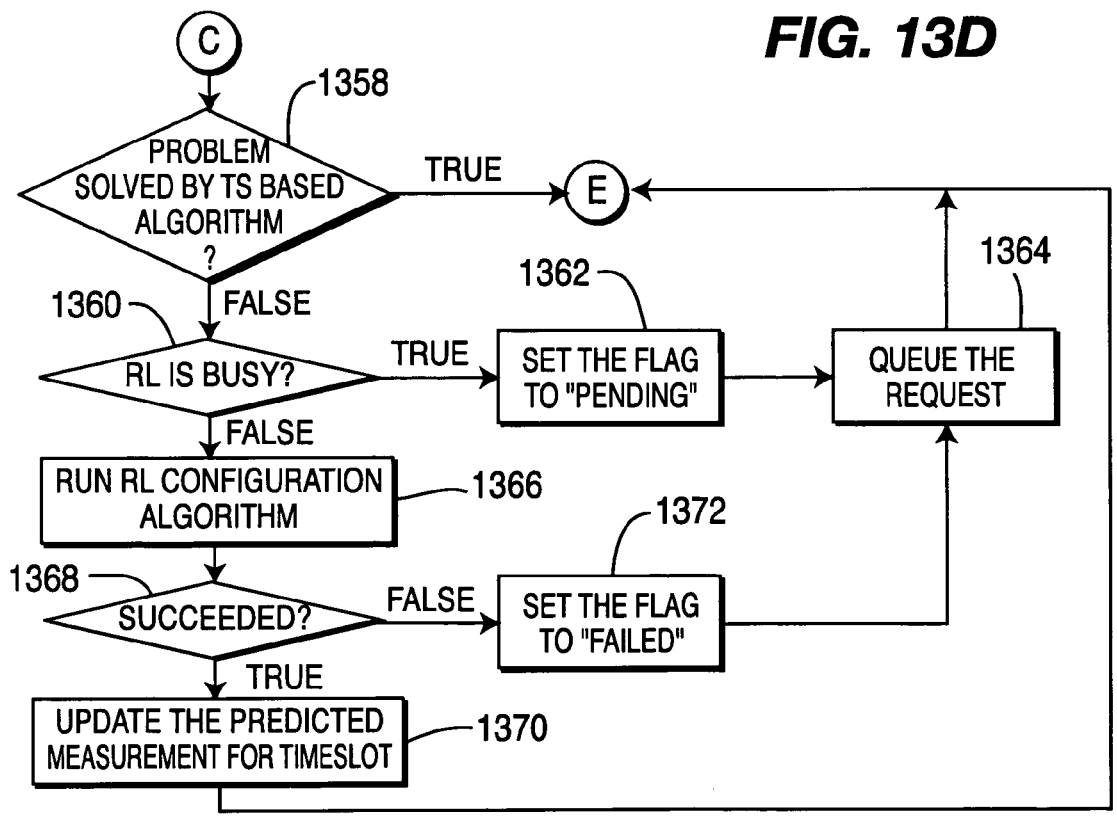

As shown in FIG. 12, the database has a list of timeslots and a list of RLs. Measurements are stored if they have crossed their respective threshold. These measurements could be cell-based measurements (per timeslot) or RL-based measurements (per CCTrCH). Handover triggers, such as Event 1G or Event 2B, are stored per RL. When a service request for a certain RL has arrived, such as call arrival or RL reconfiguration, it is stored per RL. The RL state (IDLE or BUSY) is stored per RL. Each list (i.e., the RL list and the timeslot list) has a corresponding flag. The list flag is set to TRUE if one or more items in the list is filled in, and is used to indicate to the scheduler that there is a waiting request for an RL or a timeslot.

Some system metrics can be stored in this database as well. RRM algorithms rely on system metrics for evaluating the status of the system. Some metrics can be obtained directly from measurements, whereas the algorithms based on measurements calculate other metrics. All these system metrics are stored in the centralized database and they are accessible from any RRM algorithm. Metrics include not only their correspondent value, but also a validity period for which the value is supposed to be still representative of the status of the system. During their validity period, some RRM algorithms rely on these predicted values instead of relying on the real measurements.

If an algorithm is acting upon a timeslot, predicted measurements will be written for the timeslot and could be written for the CCTrCH as well. These predicted measurements enable two algorithms to act on the same timeslot at the same time. When certain metrics are analyzed by some RRM algorithms, a predicted value of the same metric is calculated. These predicted values are also stored with the measurement-based metrics and with the validity period.

Another alternative for this implementation is to store all the triggers in priority queues and process the triggers according to their priority. It should be noted that there are numerous ways of implementation, depending on the tools and the platform, to employ the present invention, and the invention should not be specifically limited to the examples set forth herein.

ORB-Based RRM Scheduler

Each logical entity has an RRM scheduler. This scheduler coordinates between various algorithms and sets priorities for the algorithms' execution. Each scheduler has a measurement and event handler procedure. It should be noted that each scheduler can have one or more measurement and event handler procedures, and that each measurement and event handler procedure can be split into a separate measurement procedure and an event handler procedure.

The ORB-based RRM scheduler may be as simple as a centralized tool to prioritize between different algorithms, or it can be more complex and intelligent in choosing only certain algorithms for execution according to the system state. It can run many algorithms in parallel and then decide on a few of them to execute their decision. These fewer algorithms can be run in order (one after the other) to take the effect of the previous algorithms' decision on the next one.

The following are some examples of the events that will trigger the C-RNC RRM scheduler to invoke the measurement and event handler procedures:
(1) call arrival or departure;
(2) time of execution for periodical algorithms;
(3) measurements received, such as:
(a) high DL ISCP;
(b) Node B code transmission power;
(c) high UL ISCP;
(d) UL signal to interference ratio (SIR);
(e) received total wideband power; and
(f) WTRU P-CCPCH RSCP.

The following are some examples of the events that will trigger the S-RNC RRM scheduler to invoke the measurement and event handler procedures:
(1) RL Congestion Indication;
(2) UL block error rate (BLER) measurement;
(3) DL BLER measurement; and
(4) UL WTRU transmission power.

Operation of the ORB Scheduler

FIGS. 13A-13D show a detailed flowchart of a preferred embodiment of an ORB scheduler 1300 constructed in accordance with the present invention. The scheduler 1300 begins by waiting for events to be received (step 1302). Because the operation of the scheduler 1300 is event-driven, it will remain at step 1302 until an event is received. When a trigger is received, the corresponding event flag is raised (step 1304). If the event is for a specific RL, then the RL flag is also raised; if the event is for a specific timeslot, then the timeslot flag is also raised. Each event has a corresponding flag, each RL has a flag, and each timeslot has a flag. When a trigger is received, the corresponding event flag is raised and either the specific RL flag or the specific timeslot flag is raised, depending upon which the trigger relates to. The purpose of the RL flag and timeslot flag is to tell the scheduler that there is one or more event(s) waiting to be processed.

The scheduler evaluates the events and triggers, and chooses a set of algorithms to run (i.e., "m" algorithms) that could act on the events received and perform the required actions (step 1306). The scheduler runs the m chosen algorithms in parallel or sequentially (step 1308). The results obtained from the m different algorithms are evaluated. Based on the evaluation of the results, the scheduler chooses "k" out of the m algorithms that give the best outcome (step 1310). It is noted that steps 1306-1310 are optional, and represent added intelligence to the scheduler to execute fewer algorithms and to save processing time.

The selected k algorithms are processed as follows. A determination is made if there are any handover triggers (step 1312). If there are any handover triggers, then the chosen handover algorithms are executed and the predicted measurements are updated (step 1314). Another determination is made if there are any additional handover triggers waiting to be processed (step 1316). If there are more handover triggers, then return to step 1314.

If there are no handover triggers to be evaluated (step 1312) or if all of the handover triggers have been evaluated (step 1316), then a determination is made whether there are any timeslots having a measurement above a threshold, i.e., a timeslot-based trigger (step 1318).

If there is a timeslot trigger, then a determination is made whether all of the RLs are in the BUSY state (step 1320). If all of the RLs are busy, then the flag for the current timeslot trigger is set to "pending," and the trigger (request) is queued for later processing (step 1322). The scheduler then returns to step 1318 to determine if there are any additional timeslot triggers to be evaluated. If all of the RLs are not busy (step 1320), then a determination is made whether the current trigger is a reconfiguration trigger (a request for moving a CCTrCH to another timeslot to reduce the transmission carrier or noise figure in this timeslot) or a rate control trigger (a request to change the rate of a CCTrCH in this timeslot to solve the problem) (step 1324).

If the current trigger is a reconfiguration trigger, then the timeslot is reconfigured by moving a CCTrCH around (step 1326). If the timeslot reconfiguration was not successful (step 1328), then the event flag is set to "failed" (step 1330). If the current trigger is not a reconfiguration trigger (step 1324) or if the flag has been set to "failed," then the rate reduction algorithm is executed (step 1332).

If the timeslot reconfiguration was successful (step 1328) or if the rate reduction algorithm was executed (step 1332), then the predicted measurements are updated (step 1334). Next, a check is made if there are more timeslot triggers to be evaluated (step 1336). If there are more timeslot triggers to be evaluated, the scheduler returns to step 1320.

If there were no timeslot triggers to evaluate (step 1318) or if all of the timeslot triggers have been evaluated (step 1336), then a determination is made if there are any RL triggers (step 1338).

If there are no RL triggers to evaluate, then a determination is made whether there are any pending service requests or reconfigurations (step 1340). These include requests to admit new users or services or reallocate resources for existing services. If there are no service requests pending, then the periodical algorithms are run, if necessary (step 1342). The results of all of the executed algorithms are analyzed (step 1344), and the state of the current RL is set to BUSY and the new configuration is executed (step 1346). The scheduler then resets the RL state to IDLE and returns to step 1302 to wait for additional events.

If there are any pending service requests (step 1340), the appropriate admission control algorithm(s) are executed (step 1350). If the admission control algorithm(s) succeeded in allocating or reallocating the radio resources, then the predicted measurements for the current timeslot are updated (step 1354) and control is returned to step 1340. If the admission control algorithm(s) did not successfully allocate the radio resources, then the request is queued only if it is an NRT request (step 1356) and control is returned to step 1340. As noted previously, an RT request, by its very nature cannot be queued for later allocation. Accordingly, if the current service request is for an RT service, and the allocation is unsuccessful, the request will be discarded.

If there are RL triggers to evaluate (step 1338), then it is determined if the RL problem is solved by a timeslot-based algorithm (step 1358). If the problem is solved, control is returned to step 1338 to determine if there are any additional RL triggers to be evaluated.

If the problem is not solved by a timeslot-based algorithm, then a determination is made whether the current RL is in the BUSY state (step 1360). If the RL is busy, then the flag for this event is set to "pending" (step 1362), the request is queued (step 1364), and control is returned to step 1338.

If the RL is not busy (step 1360), the RL configuration algorithm(s) are run (step 1366). If the RL configuration algorithm(s) fix the problem (step 1368), the predicted measurements for the current timeslot are updated (step 1370) and control is returned to step 1338. If the RL configuration algorithm(s) did not fix the problem (step 1368), the flag for this event is set to "failed" (step 1372), the request is queued (step 1364), and control is returned to step 1338.

Figure 14:
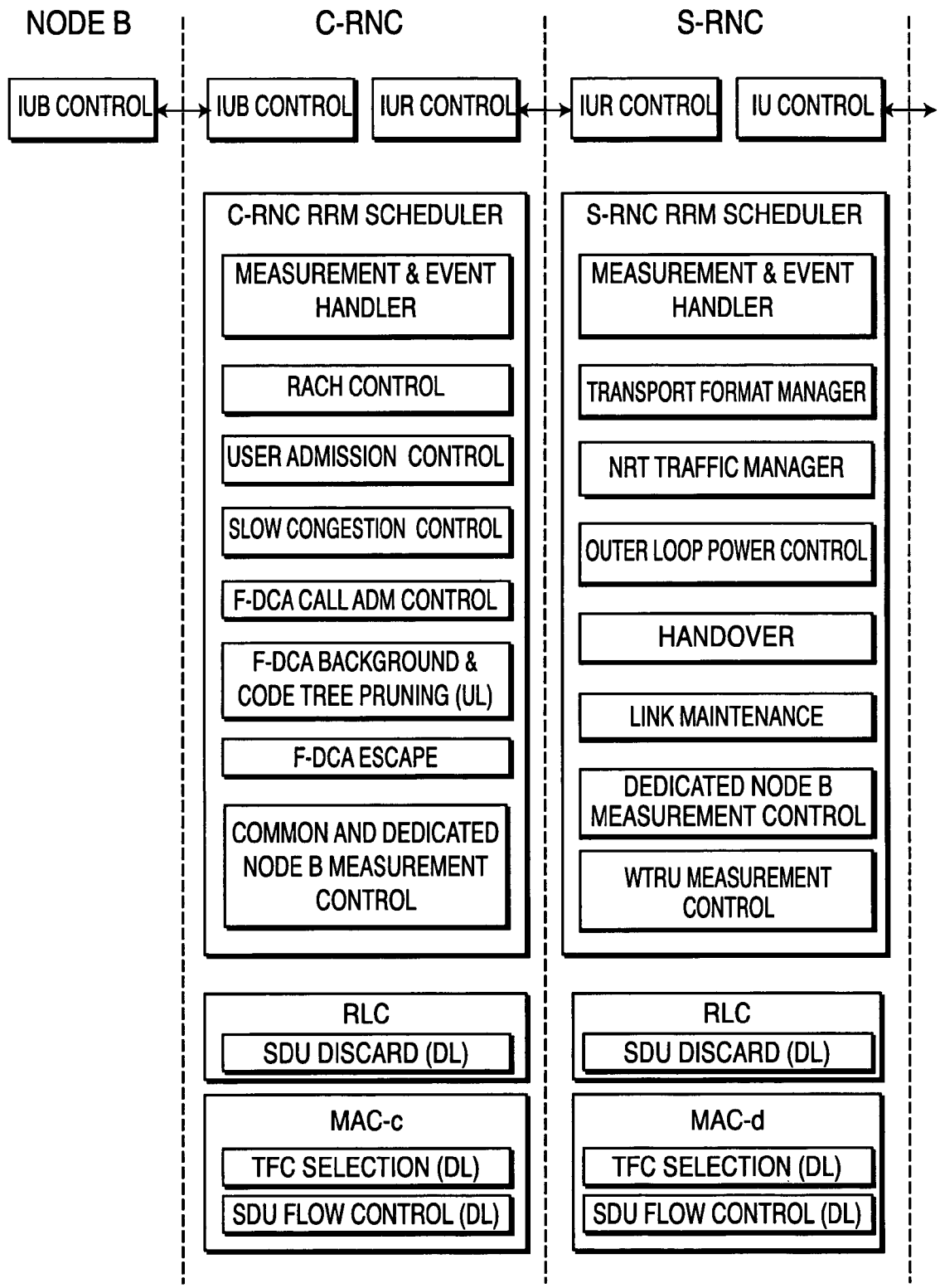
FIG. 14 is a diagram of a C-RNC and a S-RNC embodying the scheduler shown in FIGS. 13A-13D.
Figure 15:
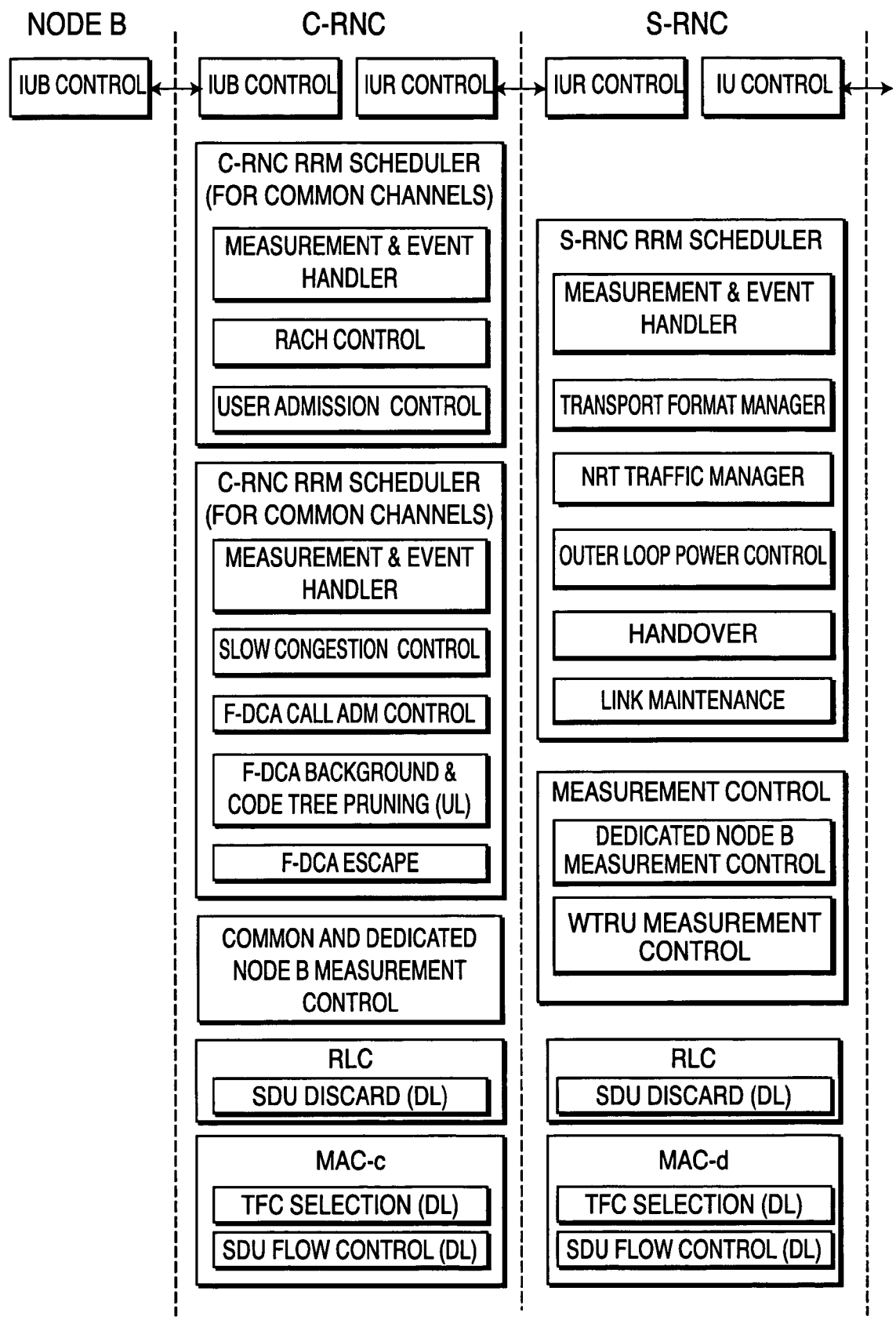
FIG. 15 is a diagram of an alternate C-RNC, using two schedulers, and a S-RNC embodying the scheduler shown in FIGS. 13A-13D.

FIG. 14 shows a diagram of a C-RNC and a S-RNC, each containing a scheduler constructed in accordance with the present invention, with measurement control functions being part of the S-RNC scheduler. FIG. 15 shows a diagram of an alternate C-RNC using two schedulers, one for common channels and a second for dedicated channels. An alternate S-RNC scheduler is shown, in which the measurement control functions reside in a separate entity outside the scheduler. It is noted that the measurement control functions can also reside in a separate entity in the embodiment shown in FIG. 14.

While specific embodiments of the present invention have been shown and described, many modifications and variations could be made by one skilled in the art without departing from the scope of the invention. The above description serves to illustrate and not limit the particular invention in any way.

What is claimed is:

1. A method for scheduling radio resource management (RRM) algorithms on a radio link, comprising:
   gathering a plurality of events and storing the events together;
   selecting a plurality of RRM algorithms to resolve the events, wherein each of the RRM algorithms in the plurality of algorithms is selected based on the plurality of gathered events;
   invoking the selected RRM algorithms, wherein input to each algorithm comprises at least one of the events and each of the events is an input for at least one of the algorithms;
   analyzing results of the invoked RRM algorithms;
   determining at least two of the selected algorithms, said at least two algorithms to be executed to achieve an optimal result to resolve the events received, said determination being based on said analyzing;
   executing said at least two algorithms on the radio link; and
   placing the radio link into a busy state such that only of said at least two algorithms can operate on the radio link at a time, the radio link remaining in the busy state for the duration of the execution of each of said at least two algorithms.

2. The method according to claim 1, wherein said executing includes:
   preparing a set of predicted measurements for use by the other RRM algorithms of said at least two algorithms.

3. The method according to claim 1, wherein the RRM algorithms include configuring a radio link.

4. The method according to claim 1, wherein the RRM algorithms include reconfiguring an existing radio link.

5. The method according to claim 1, wherein if said at least two algorithms need access to a radio link that is in the busy state, then:
   setting a flag associated with said at least two algorithms to indicate a pending state; and
   queuing said at least two algorithms to be performed at a later time.

6. The method according to claim 5, comprising performing any queued RRM algorithms when the radio link is in the idle state.

7. The method according to claim 2, comprising storing the set of predicted measurements in a centralized database.

8. The method according to claim 1, further comprising ordering said at least two algorithms, the ordering being performed before said executing.

9. A method for scheduling radio resource management (RRM) algorithms, comprising:
   gathering a plurality of events, wherein at least one RRM algorithm is associated with each event;
   storing the events together;
   placing a radio link into a busy state for the duration of an RRM algorithm's execution, whereby all other RRM algorithms are denied access to the radio link until the completion of the RRM algorithm;
   performing the RRM algorithm on the radio link;
   preparing a set of predicted measurements for use by the other RRM algorithms; and
   placing the radio link into an idle state, whereby the radio link is accessible by any RRM algorithm.

10. The method according to claim 9, wherein the at least one RRM algorithm includes configuring a radio link.

11. The method according to claim 9, wherein the at least one RRM algorithm includes reconfiguring an existing radio link.

12. The method according to claim 9, wherein if the RRM algorithm to be performed needs access to a radio link that is in the busy state, then:

setting a flag associated with the RRM algorithm to indicate a pending state; and queuing the RRM algorithm to be performed at a later time.

13. The method according to claim 12, comprising performing any queued RRM algorithm when the radio link is in the idle state.

14. The method according to claim 9, comprising storing the set of predicted measurements in a centralized database.

15. The method of claim 1, wherein said invoking comprises invoking the selected RRM algorithms in parallel.

16. The method of claim 1, wherein said invoking comprises invoking the selected RRM algorithms sequentially.

* * * * *

UNITED STATES PATENT AND TRADEMARK OFFICE
CERTIFICATE OF CORRECTION

PATENT NO. : 7,430,427 B2
APPLICATION NO. : 10/761858
DATED : September 30, 2008
INVENTOR(S) : Briancon et al.

It is certified that error appears in the above-identified patent and that said Letters Patent is hereby corrected as shown below:

On the Title Page Item (56), U.S. PATENT DOCUMENTS, left column, after line beginning with "6,771,624" insert --6,920,148  7/2005  Kato--.

On the Title Page Item (56), FOREIGN PATENT DOCUMENTS, right column, before line beginning with "WO 99/16227" insert --EP  0964595  12/1999--.

On the Title Page Item (56), OTHER PUBLICATIONS, right column, at line beginning with "Tibbitts" before the words "A Common" delete "COBRA:" and insert --CORBA:--.

At column 3, line 48, before the words "a Node B" delete "limited, to" and insert therefor --limited to,--.

At column 6, line 55, after "(RSCP)", delete "of" and insert therefor --or--.

At column 9, line 4, before "NRT", delete "a" and insert therefor --an--.

At column 10, line 24, after the words "another RL", delete "in-the" and insert therefor --in the--.

At column 10, line 55, after the words "events that", delete "k".

At column 10, line 65, after the word "threshold," delete "a RL" and insert therefor --an RL--.

UNITED STATES PATENT AND TRADEMARK OFFICE
CERTIFICATE OF CORRECTION

PATENT NO. : 7,430,427 B2
APPLICATION NO. : 10/761858
DATED : September 30, 2008
INVENTOR(S) : Briancon et al.

It is certified that error appears in the above-identified patent and that said Letters Patent is hereby corrected as shown below:

At claim 1, column 14, line 25, after the word "only", insert --one--.

Signed and Sealed this

Thirtieth Day of December, 2008

JON W. DUDAS
*Director of the United States Patent and Trademark Office*